United States Patent [19]

Mori et al.

[11] Patent Number: 4,733,309
[45] Date of Patent: Mar. 22, 1988

[54] APPARATUS FOR ENABLING AN OPERATOR TO MOUNT AN UNEXPOSED FILM ON AND DEMOUNT AN EXPOSED FILM FROM THE DRUM OF A COLOR SCANNER VIA A LIGHT-BLIND WINDOW

[75] Inventors: Yoshishige Mori, Fushimi; Hitomi Atoji, Kita, both of Japan

[73] Assignee: Dainippon Screen Mfg. Co., Ltd., Kyoto, Japan

[21] Appl. No.: 890,522

[22] Filed: Jul. 30, 1986

[30] Foreign Application Priority Data

Aug. 2, 1985 [JP] Japan .................. 60-171474

[51] Int. Cl.$^4$ .............. H04N 1/06; H04N 1/04; G03B 27/58
[52] U.S. Cl. .................. 358/289; 358/285; 358/302; 355/72
[58] Field of Search ............ 358/75, 78, 80, 285, 358/289, 290, 291, 292, 302; 355/47, 72

[56] References Cited

U.S. PATENT DOCUMENTS

| | | | |
|---|---|---|---|
| 3,437,409 | 4/1969 | Friedel | 355/21 |
| 3,870,518 | 3/1975 | Fels | 354/181 |
| 3,935,584 | 1/1976 | Fels | 354/181 |
| 4,259,695 | 3/1981 | Nakano | 358/291 |

FOREIGN PATENT DOCUMENTS 42086 10/1977 Japan .

Primary Examiner—James J. Groody
Assistant Examiner—Randall S. Svihla
Attorney, Agent, or Firm—Lowe, Price, LeBlanc, Becker & Shur

[57] ABSTRACT

An apparatus for mounting an unexposed film on and demounting an exposed film from a color scanner is described. The color scanner includes a recording chamber, a rotary drum therein and cassettes for containing unexposed film and exposed films which are normally mounted in communication with the recording chamber but which are detachable therefrom. There is described a light-blind window in the recording chamber which will permit an operator to extract an unexposed film from an unexposed film cassette, mount it on the rotary drum, and after it has been exposed, remove it from the rotary drum and place it in an exposed film cassette which then may be taken to a developing unit.

6 Claims, 5 Drawing Figures

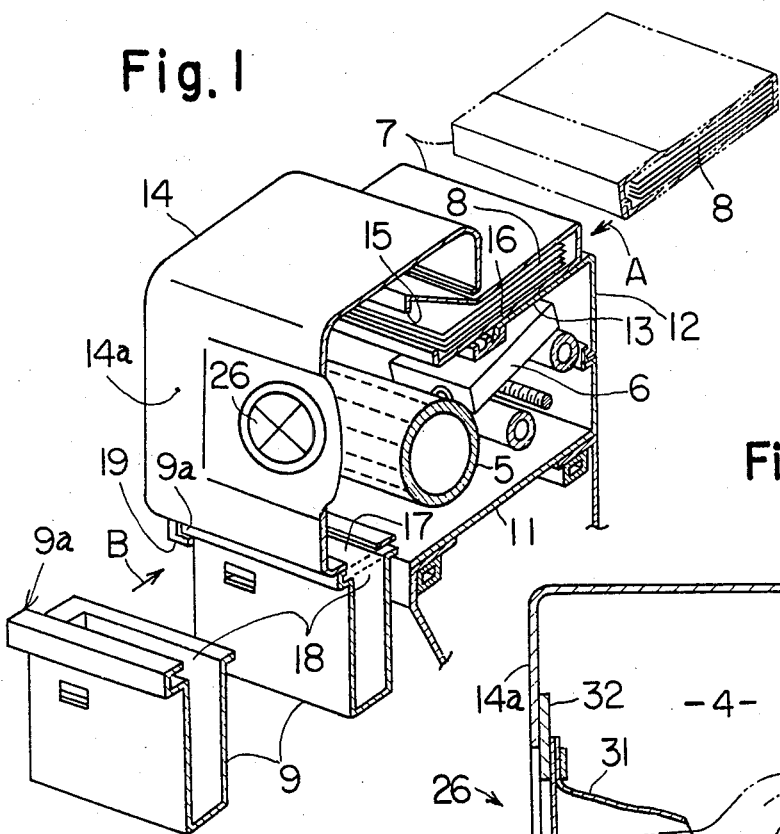
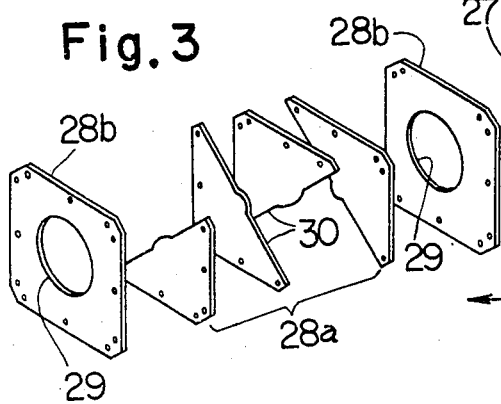
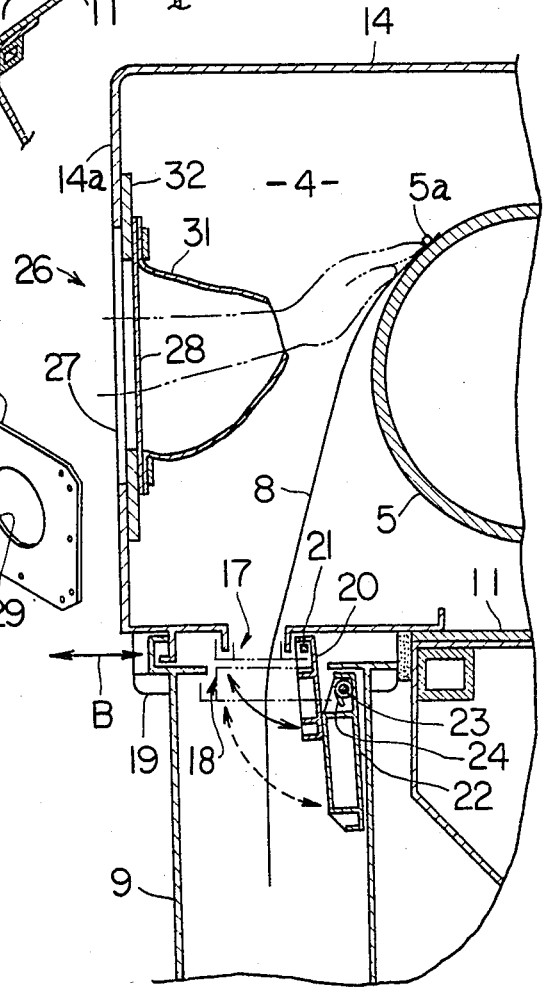

APPARATUS FOR ENABLING AN OPERATOR TO MOUNT AN UNEXPOSED FILM ON AND DEMOUNT AN EXPOSED FILM FROM THE DRUM OF A COLOR SCANNER VIA A LIGHT-BLIND WINDOW

BACKGROUND OF THE INVENTION

1. Field of the Invention

The present invention relates to an apparatus for mounting and demounting a film on the color separation pictures unit, such as a color scanner, and more particularly to an apparatus for such kind allowing the operation in a lighted room.

2. Description of the Prior Art

It is necessary to mount unexposed films on the color picture separation unit, such as a color scanner, and when the films are exposed they must be demounted therefrom for the developing process. Referring to FIG. 5, the common practice of mounting and demounting films will be described:

To mount a film 8 on a drum 5, a cover 32 of a recording chamber 4 is opened, the film 8 is taken out of a cassette in red light, and mounted on the drum 5.

The film has holes previously made along its edge 8a. The drum 5 has pins 5a transversely produced, and when the film 8 is placed on the drum, the pins 5a are fitted in the respective holes so as to fix the film on the peripheral surface of the drum 5. Then a switch 33 is turned on to rotate the drum, during which the film is under suction provided through a number of pores produced on the peripheral surface of the drum 5. There is provided a roller 34, commonly called a squeezing roller, which presses the film 8 to the drum in rotation. When one rotation is finished, the drum 5 stops.

When the film 8 is to be demounted from the drum 5, the operation is also carried out in red light. The films are collected in a casing, and sent to the developing process.

Recently a dot generator has been developed, which can electronically produce clear halftone dots of high quality, and for this generator a helium-neon laser beam is employed. In such cases a dark green lamp is used, under which it is so dark that the operator must take time before his eyes get used to darkness.

To solve the problem encountered in handling the film in darkness, the invention disclosed in Japanese Kokoku 52-42086 has provided a solution:

According to the disclosure a cassette containing unexposed film is fixed at a point adjacent to the drum, and the operator operates a handle so as to rotate the drum, during which the film is automatically mounted on or demounted from the drum.

The use of a safety lamp spoils the working conditions, and when it is dark, it takes time before the operator's eyes get used to darkness. When the scanner as a whole or its recording section alone is located in a dark room a partition and ancillary equipment, such as lighting equipment, switches, must be provided on each apparatus.

The apparatus disclosed in Japanese Kokoku 52-42086 is disadvantageous in that the construction is likely to become complicated, and is liable to breakdowns. Another disadvantage is that it is necessary to charge the cassette with films in darkness, and bring it to the recorder.

The present invention aims at solving the problems pointed out with respect to the known system of mounting the demounting film on the color scanner, and has for its object to provide an apparatus for mounting and demounting films on the color scanner in a lighted room, thereby eliminating the necessity for a dark room.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description and drawings.

SUMMARY OF THE INVENTION

According to the present invention, there is provided an apparatus for mounting and demounting films on a color scanner or the like, the apparatus comprising:

a recording chamber including a rotary drum and a film outlet opening;

means for containing unexposed films, which is detachably provided in the recording chamber; and a light-blind window produced in that side of the recording chamber which is located toward the operator.

BRIEF DESCRIPTION OF THE DRAWINGS

FIG. 1 is a cross-sectional perspective view taken along the line I—I in FIG. 4;

FIG. 2 is a cross-sectional side view taken along the line of I—I;

FIG. 3 is an analytical perspective view showing the light-blind window 26 shown in FIG. 1;

DETAILED DESCRIPTION OF THE INVENTION

Figure 4:
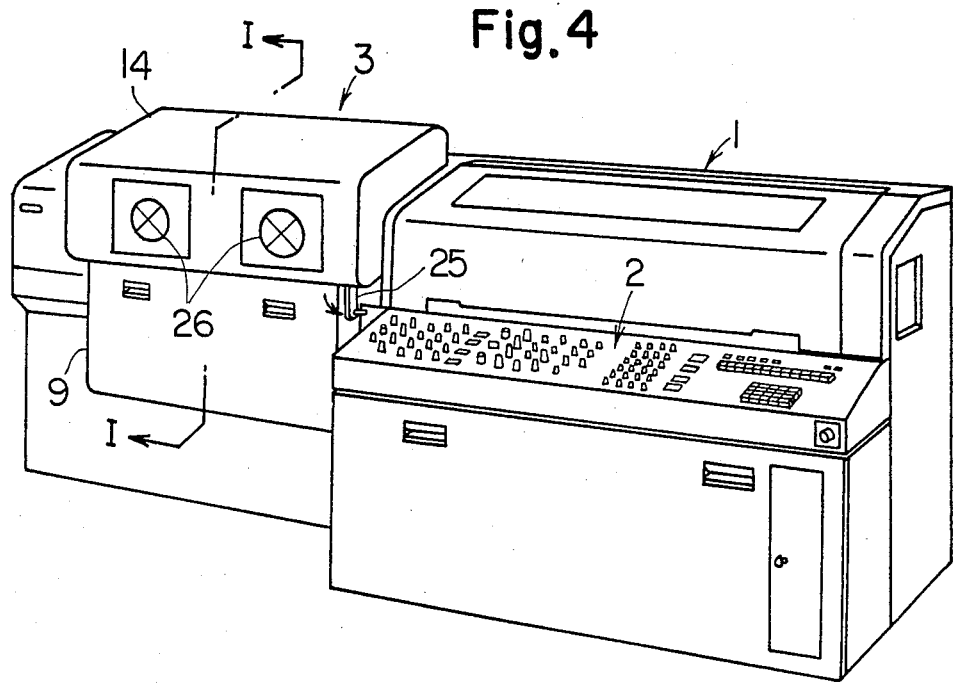
FIG. 4 is a perspective view showing the entire color scanner unit incorporating the apparatus embodying the present invention.
Figure 5:
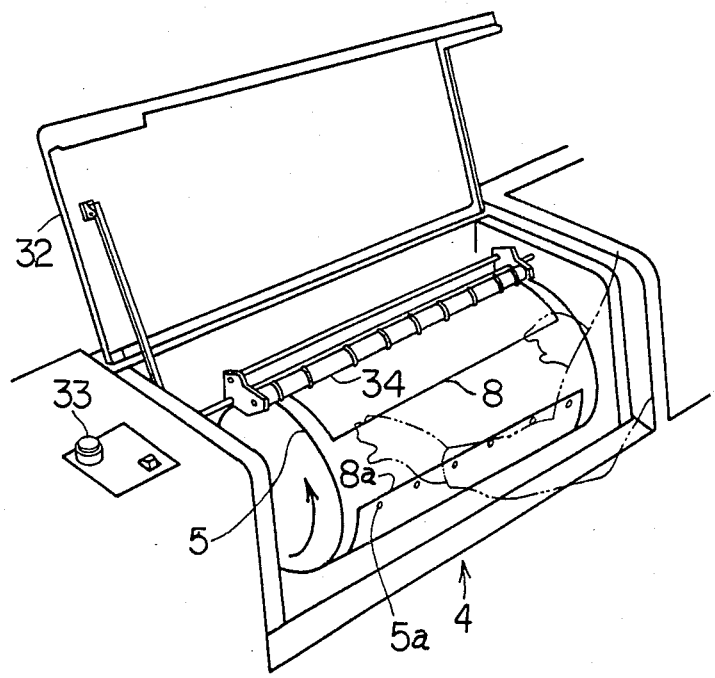
FIG. 5 is a perspective veiw showing a conventional color picture recording section.

Referring to FIG. 4, which is a perspective view showing a color scanner incorporating an apparatus of the present invention, the reference numerals 1, 2 and 3 denote an original reading section, a console and a color picture scanning section 3, respectively.

Referring to FIGS. 1 and 2, there are provided a recording chamber 4, a drum 5, a recording head 6, a cassette 7 for containing unexposed films 8, a cassette 9 for containing exposed films, and a light-blind window 26 through which the operator handles the films, the window being provided in the wall 14a of the recording chamber 4.

The recording chamber 4 includes a bottom 11, a back wall 12, a ceiling 13 and a cover 14, with the rotary drum 5 and the recording head 6 accommodated therein, wherein the recording head 6 records color pictures during the rotation of the drum in the subscanning direction.

The cassette 7 is placed in a space 16 formed between the ceiling 13 and the cover 14, with its open end being faced toward the operator. The film 8 is inserted into the space 16 in the direction of arrow (A).

The exposed film collecting cassette 9 is located at a place 19 underneath the recording chamber 4 in such a manner as to fix it readily in the direction of arrow (B).

The recording chamber 4 includes an opening 17 which communicates with an opening 18 in cassette 9. The cassette 9 is fixed to the recording chamber 4 by means of a hook 19 which engages the bent edge 9a of the cassette 9. The openings 17 and 18 are closed against light by means of lids 20 and 22, respectively.

The lid 22 is connected to the cassette 9 by means of a pivot 23 so that it can rotate in the direction indicated by dotted lines, wherein the lid 22 normally closes the opening 18 under the action of a coil spring 24 wound around the pivot 23.

The lid 20 is jointed to a shaft 21 to which a handle 25 (FIG. 4) is fixed, and normally closes the opening 17 under the action of a coil spring (not shown).

When the handle 25 is operated by the operator, the lid 20 is rotated in the counter-clockwise direction in FIG. 2, during which the lid 22 is forced to move in the same direction against the spring. When the handle 25 is returned to its original position, the lids 20 and 22 are caused to return under the action of the springs until they close the openings 17 and 18.

The light-blind window 26 includes a shade 28 for preventing light from entering the recording chamber 4, and a sleeve 31 for the same purpose. As shown in FIG. 3, the shade 28 can be made of triangular rubber plates 28a and rectangular side plates 28b of rubber, the side plates each having holes 29 in the center, wherein the triangular plates 28a are disposed side by side with their longest sides 30 crossing one another.

The sleeve 31 is made of cloth rolled into a cylinder, wherein its terminating end is wrung with an elastic string, such as rubber string, so as to allow the operator's hand to pass through.

Either of the shade 28 or the sleeve 31 can be omitted if the other is made of a material of sufficient elasticity to return to its original state.

In operation, the cassette 7 containing unexposed films is inserted into the space 16 with its open end being faced toward the recording chamber 4.

Another cassette 9 is set at the space 19 underneath the recording chamber 4. The handle 25 is operated so as to open the lids 20 and 22, thereby effecting the communication between the openings 17 and 18. The communication between the openings 17 and 18 can be effected after the color pictures are recorded on the unexposed films.

Then the operator inserts his hands into the light-blind windows 26, and take the unexposed film 8 out of the cassette 7. The film 8 is fixed to the drum 5 wherein the pins 5a thereof are fitted in the holes of the film 8.

Subsequently the start switch (not shown) on the console 2 or on the recording chamber 4 is turned on, so as to effect the suction and the rotation of the drum 5. During one rotation the film is kept into close contact with the peripheral surface of the drum 5. Then the drum 5 is stopped, and the recording starts.

Although a squeezing roller is not shown in FIGS. 1 and 2, it can be employed. To secure the film to the drum it is possible to use an adhesive tape to fix the end of the film to the drum.

After the recording is finished, the film 8 is removed from the drum 5, and placed in the cassette 9. The lids 20 and 22 are closed, and the cassette 9 is removed from the recording chamber 4. The cassette 9 is sent to the developing section.

In the embodiment described above the film is a sheet, but the present invention can be applied to a rolled film housed in a cassette used for a rolled film with the use of a film dispenser which cuts the film to a desired length.

Under the present invention the cassette 9 for collecting the exposed films can be omitted, and the films can be sent directly to the developing section without the use of any intermediate means.

As evident from the foregoing description, the following advantages have been achieved:

(1) The structure of the apparatus is simplified, and the operation is easy, in that the films can be mounted and demounted on the drum in a lighted room.

(2) The films are manually handled without the use of any mechanical means, thereby ensuring the safe maintenance thereof.

(3) The cassettes containing unexposed and exposed films can accommodate many sheets of films at one time, thereby leading to labor-saving and increased working efficiency.

What is claimed is:

1. An apparatus for mounting a film on and demounting the film from a color scanner or the like, the scanner including a recording chamber with a rotary drum and a film outlet opening, the apparatus comprising:
   means for containing unexposed films detachably mounted on the scanner adjacent to the drum and opening into the recording chamber; and
   a light-blind window located in a side of the recording chamber which is located toward an operator whereby an unexposed film can be manually removed from the unexposed film containing means, mounted on the drum and removed from the drum after being exposed by scanning.

2. An apparatus as defined in claim 1, wherein the light-blind window comprises a shade whereby light is prevented from entering the recording chamber.

3. An apparatus as defined in claim 1, wherein the light-blind window comprises a sleeve projecting from an opening in the side of the recording chamber into the recording chamber whereby light is prevented from entering the recording chamber.

4. An apparatus as defined in claim 1, wherein the light-blind window comprises a shade and a sleeve whereby light is prevented from entering the recording chamber.

5. An apparatus as defined in claim 1, wherein the unexposed film containing means is an open-ended cassette located above the drum with its open end facing toward the operator.

6. An apparatus as defined in claim 1, further comprising exposed film containing means located beneath the film outlet opening of the recording chamber whereby the exposed film containing means is able to receive exposed films from the recording chamber, and wherein the film outlet opening of the recording chamber and an opening in the exposed film containing means each are closable by light-blind means movable in association with each other.

* * * * *